Jan. 30, 1962 J. W. CLINEFELTER 3,018,516
PLASTIC EXTRUDING MACHINE
Filed May 2, 1958 2 Sheets-Sheet 1

INVENTOR
JAMES W. CLINEFELTER
BY
ATTORNEYS

Jan. 30, 1962   J. W. CLINEFELTER   3,018,516
PLASTIC EXTRUDING MACHINE
Filed May 2, 1958   2 Sheets-Sheet 2
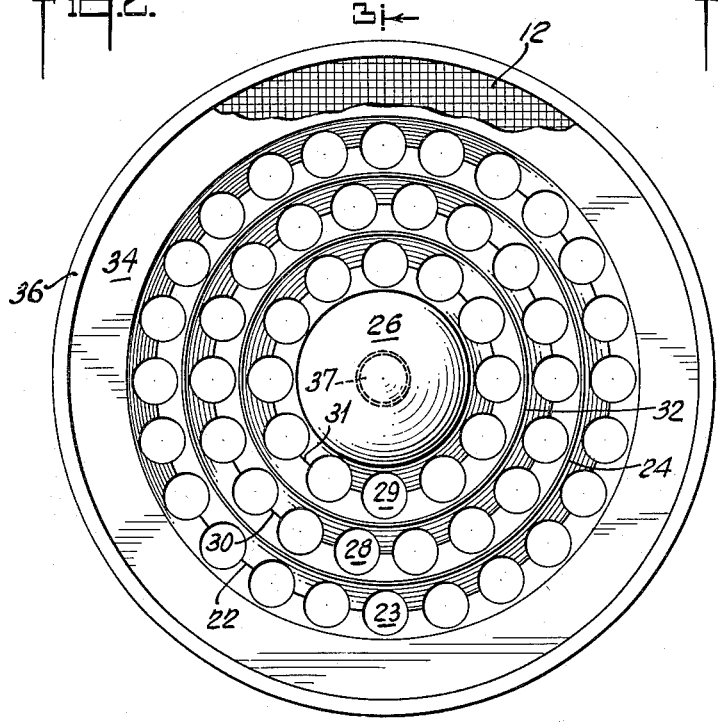
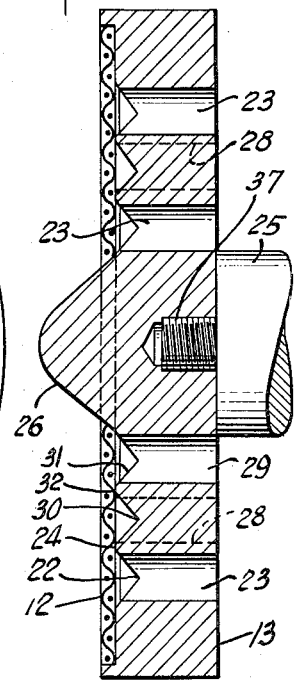
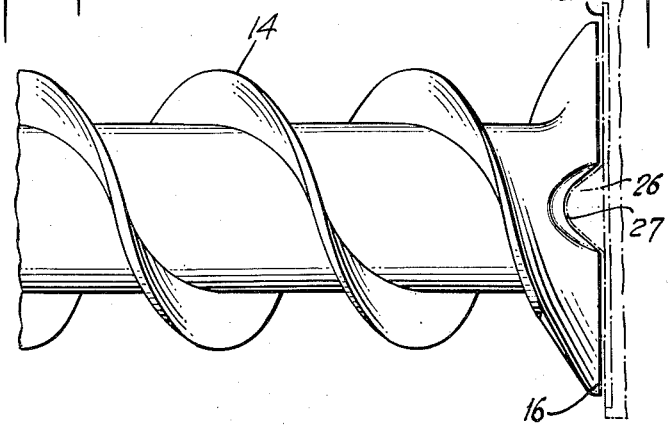
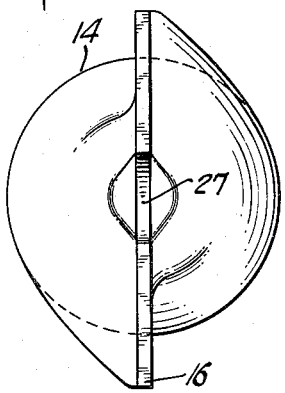
INVENTOR
JAMES W. CLINEFELTER
BY
ATTORNEYS

United States Patent Office 3,018,516
Patented Jan. 30, 1962

3,018,516
PLASTIC EXTRUDING MACHINE
James W. Clinefelter, 618 Ridgecrest Road, Akron 3, Ohio
Filed May 2, 1958, Ser. No. 732,626
4 Claims. (Cl. 18—14)

The present invention relates to a perforated unit for use in screw fed plastic extruders equipped with shaping dies for extruding hollow articles, such as rubber tubing, and although it has many uses, it is particularly adapted for use in connection with machines of the general character described in prior Patents 2,291,212 and 2,595,210, and in copending application Serial No. 732,625, filed May 2, 1958.

In the aforementioned patents, there is described an extruding machine having a feed screw, an exit chamber and a perforated unit between said feed screw and said chamber. This perforated unit comprises an open mesh screen and a supporting plate designed to support said screen and making face contact therewith and formed with a multiplicity of through-holes distributed over the effective area of the screen.

The aforesaid patents also disclose a construction, in which the chamber enclosing the screw and impeller flares outwardly towards the larger diameter of the perforated unit. Such construction permits a larger cross sectional area and also larger impeller blades, so that for any given screw speed, a larger volume of material can be forced through the perforated unit. This reduces the back pressure on the feed screw and results in far less turbulence and therefore less generated heat and greater machine capacity.

As the plastic material passes through the impeller, it is forced thereby through the perforated unit and then cut off by the rotating impeller blades. This operation forms a multitude of comparatively small bits of the plastic material which emerges on the delivery side of the perforated unit into a conglomerate mass. The material is thereby physically plasticized and throughly mixed prior to its being forced out through the die and core to make the product.

It will be noted that the integral feed screw and impeller blades have the advantage of affording structural rigidity, better control and increased production due to the increased area for handling the material at the flared ends, provided it can be forced through the perforated unit in sufficient volumes. The material is advanced by the feed screw into as many helical streams as there are full threads. When each of these streams reaches the field of action of the impeller, it is equally subdivided by each blade (in some instances by additional blades of the impeller) and advanced through the perforated unit and out through the shaping die. The blade action effects much better dispersion and higher extruding speeds and still effects multiple positive cutoffs at the perforated unit.

In the past the problems with the perforated unit and a separate core spider have been as follows:

(1) Shrouding of considerable screen area with consequent clogging, hardening and burning of material in this area, making it extremely difficult to disassemble and clean the screen and chamber.

(2) Due to the reduced useable screen area, the machines have been limited in output.

(3) Due to the reduced useable screen area, the speed of the plastic material through the existing openings has been much higher, thereby increasing mix temperatures and in some instances necessitating cooling the perforated unit in order to avoid spoilage of the material.

(4) The design of prior perforated units made it impossible to prevent leakage of material around the outer edge.

(5) The old way of mounting the die core on a spider in the mixing chamber made it almost impossible to plasticize the material after splitting at the spider and not show longitudinal seam marks or even to avoid product failure at these points.

The design of the combined perforated device and die core support herein disclosed was conceived with the idea of overcoming all of the above serious objections and it will later be seen that this has been accomplished. In the first place, the question of shrouding the screen area with consequent loss of output and difficulty of cleaning has been entirely eliminated, and at the same time the problem of extreme temperature rises has also been solved. The other items of extreme importance are that the design disclosed herein not only supports but locks the screen in place and still provides sealing means for containing the plastic material in the chamber. In addition, it accurately places tne screen and die core in the chamber at all times and eliminates the necessity of adjustment on the feed screw due to screen distortion and controls the material at the dead center on the entrance face.

Referring to the drawings:

FIG. 2 is an entrance face view of the perforated unit showing the die core mounted on the exit face thereof;

FIG. 3 is a sectional view taken on line 3—3 of FIG. 2;

FIG. 4 is a side elevation of a feed screw equipped with a two bladed impeller for use with the perforated unit shown in FIG. 2 and FIG. 3; and FIG. 5 is an end view of screw shown in FIG. 4.

Figure 1:
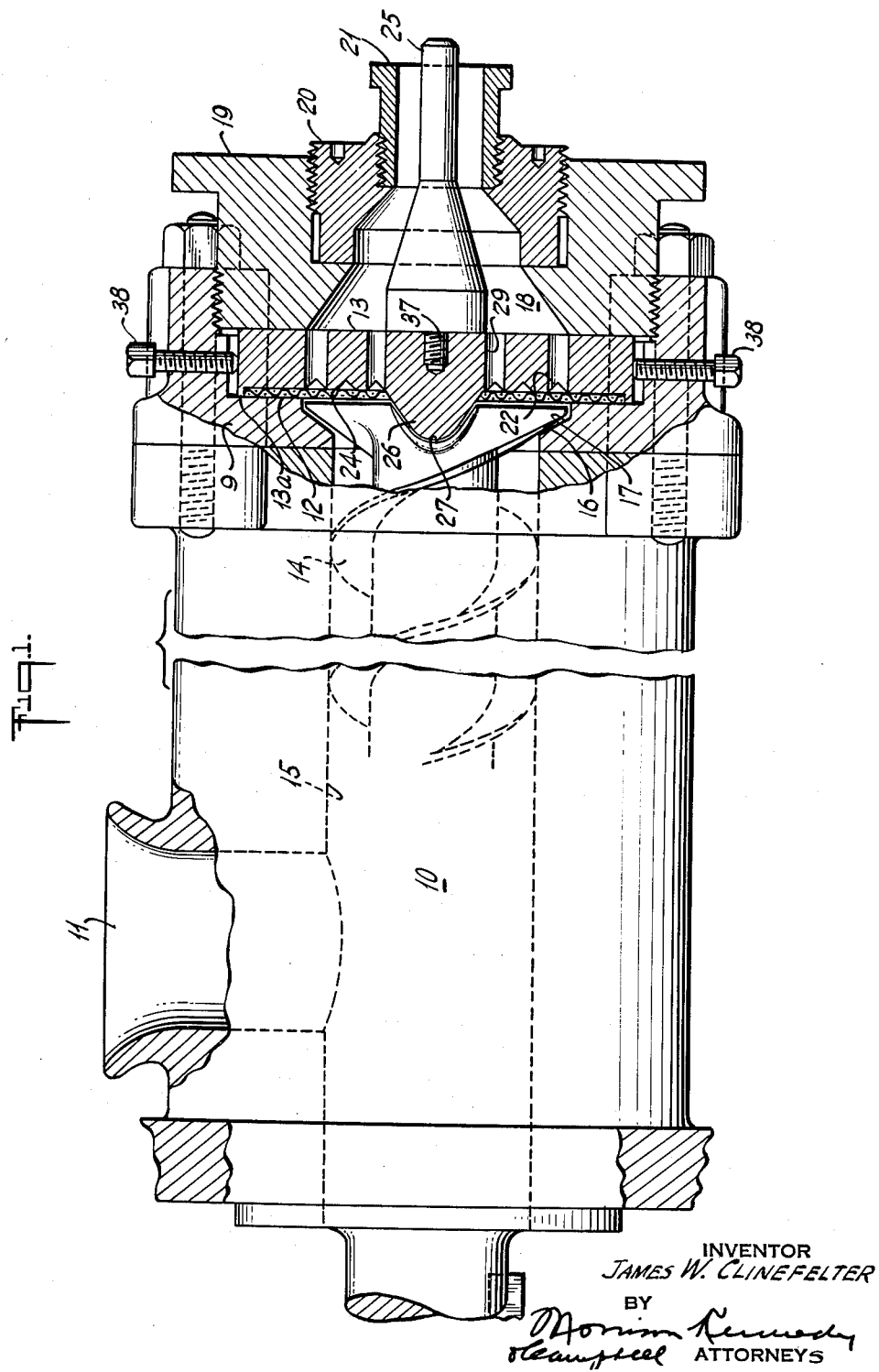
FIG. 1 is a side elevation, partly in section, of a portion of an extruding machine equipped with a form of feed screw and impeller for extruding the plastic material through a circular perforated unit upon which is mounted the die core for extruding hollow tubular products.

Referring to FIG. 1 of the drawings, there is shown a general type of extruding machine equipped with a die and core for manufacturing hollow products in which the perforated unit 12, 13 of the present invention is particularly adapted. The material to be extruded is conveyed from hopper 11 by a rotating screw 14 with flared impeller 16 into a conical chamber 18 from which it is forced under suitable pressure through die 21 and around core 25 for normally producing hollow rubber products, such as inner tubes. The screw 14 (only part of which is shown) is rotatably arranged in a cylindrical passageway 15 provided in the delivery end portion of the extruding machine 10. The screw 14 is of the usual conveyor type and is supported by the usual end bearings (drive end) and by the engagement of the outer edges of the threads or convolutions with the walls of the cylindrical passage 15 which completely support and take up all thrust delivered by the screw in its operation of pushing the material through the machine. In addition, the screw 14 terminates in an outwardly flaring impeller 16 operating in a flared bore 17. The impeller 16 with its inclined surfaces receives the material from the feed screw 14 and, as, the inclined surfaces rotate and sweep the surface of the screen 12, the result is that the material which is being urged forward along the inclined surfaces of said impeller is positively pushed through the perforated unit. The positive action of the impeller blade 16 eliminates to a large degree the back pressure which would be ordinarily exerted upon the conveyor screw. Furthermore the relieving of the entrances to the holes in the supporting plate 13 (as will be more fully described later on) allows the impeller to push the material through the perforated unit with greater ease and far less turbulence and still shear off the material that has already passed through the screen 12, thus severing it from the rest of the batch that follows. As the blades of the impeller 16 continuously impart a rotating movement to the mass in addition to the forward pushing movement, it will be seen that after every severance at any given performation the material next pushed therethrough will be from a different portion of the batch. And as such action is continuous, occurring as it does at each perforation of the screen twice during each rotation of the impeller 16, thorough mixing of the batch will result.

The delivery portion of the machine terminates in a flange on which is mounted an extension head formed in part by two annular members 9 and 19, the inner member 9 being secured by studs threaded into the flanged end of the machine and which pass through holes provided for the purpose in the member 9 around the external periphery thereof. Nuts threaded upon the ends of the studs and screwed up tightly against the member 9 secure the extrusion head in place. The outer or end member 19 of the extrusion head is threaded into the adjacent member 9 and is used to lock the screen 12 in place as well as seal the perforated unit at 13a.

Adjacent its outer face, the head member 19 is internally threaded to receive a die holder 20 which likewise is internally threaded to receive the die 21. The holder 20 will accommodate dies of different configurations, and, of course, variations in the size of the die can be accommodated by the substitution of different die holders. In the embodiment illustrated, a core 25 is associated with the die 21, the core being threaded at its inner end into the solid center or hub portion of the screen supporting plate 13 by means of screw 37. Proper centering of the core with respect to the die is obtained by a series of four set screws 38 (two not shown) equally spaced around the periphery of the head member 9 and extending radially inward so as to engage the supporting plate 13. The manner of adjusting the perforated unit and consequently the core will be apparent from the drawing.

The chamber 18, which is defined by the inner walls of the two annular shaped head members 9 and 19, is divided into two parts by the transverse perforated unit 12, 13. In the embodiment shown in FIG. 1 the circular open mesh screen 12 is fitted snugly in a circular recess 34 formed in the circular supporting plate 13, which latter is provided with a series of holes drilled therethrough in the direction in which the material moves through the machine, and the holes being distributed over the entire active surface of the screen 12. The holes are arranged in circular rows 23, 28 and 29 to provide supporting lands 24 and 32 between the rows and thereby provide adequate support to the screen 12. In addition, the entrance ends of the hole are relieved by circular concentric V-shaped grooves 22, 30 and 31 turned in the entrance face of the supporting plate and which allow full use of the screen area and also facilitates the flow of the material through the screen and thence through the holes in the plate 13.

The recess in the face of the plate 13 is not of sufficient depth to allow the screen to be fully contained therein, but rather is of slightly less depth to first center and hold the screen in place and later clamp said screen between heads 9 and 19 when the latter is screwed up into place. The face 36 of plate 13 will then provide an annular seal around the outside periphery of screen and supporting plate and prevent the leakage of any material from the impeller bore 17.

A cone shaped protuberance 26 is formed on the entrance face of plate 13 and passes through a center hole formed in the screen. The cone 26 is of prime importance in preventing the material from becoming static in the middle or hub portion of the plate. In addition, it guides the material from the center section into the first circular row of holes surrounding it. This cone shaped protuberance 26 projects into but does not contact with a clearance notch or recess 27 cut into and through the impeller blade 16.

The mounting of the die core 25 on the outlet side of plate 13 makes it possible to extrude a hollow tube or article without the danger of ridges that would normally be encountered if a core bridge were used to support said core as in the patents before mentioned. In normal operation, the hydraulic pressure will also serve to keep the core centered due to its being even over the entire surface thereof. In adjusting the perforated unit for centering the core 25 in the die 21, it will be noted that there is sufficient clearance between the entrance cone 26 and the impeller blade recess 27 to avoid a rubbing or wearing contact.

The entrance cone 26 assists in centering screen 12 in the containing recess in the face of the supporting plate 13 but, of more importance, it controls the flow of the material in the center area where it might otherwise become static and burn. Moreover, by its clearance-fitting into the recess 27 of the impeller blade 16, the entrance cone 26 tends to feed the material from the center (dead) area off into the first circular row of holes and thereby stops any burning or heating.

It is emphasized that the entrance cone 26 does not at any time make contact with the walls of the notch or recess 27, the clearance provided being sufficient not only to permit adjustment of the perforated unit in centering the die core but also to permit endwise adjustment of the conveyor screw and impeller blade in taking up wear or in varying the distance of the cutting edges of the impeller blades from the screen. Actually, the recess 27 does not surround the cone 26, being open at the sides by cutting away the hub of the screw to permit the material to flow through the recess and past the cone 26. Being thus in notch form, the tapered edges of the recess act as cutting edges which sweep around the cone 26 and keep it clear of the plastic material much in the same way as the radial cutting edges of the impeller cooperate with the screen.

It may be mentioned that, in order to handle the screen and supporting plate as a unit, the latter is provided at different points around its screen clamping surface with magnetized cores which hold the screen in place as it is inserted into and removed from the machine.

The die core 25 is screwed into the exit face of plate 13 by means of screw 37 and rigidly held in place thereby. This assembly therefore allows control of material on entrance side, supports the die core and allows adjustment thereof inside die and in addition makes it simple and easy to disassemble, clean and adjust. In short it may be simply stated that the combined perforated unit and die core as herein disclosed increases the efficiency of the machine by adding thereto means for controlling inflow and outflow of material as well as providing mounting and adjusting means for the die core, with no defects in the extruded product.

While the improved perforated device is herein shown as applied to an extruder equipped with a simple circular die and core it can be used in normal practice with all shapes and cross sectional area of dies and cores as well as in extruding machines with or without impellers.

In the accompanying drawings, the invention has been shown merely by way of example and in preferred form, but obviously many variations and modifications may be made therein which will still be comprised within its spirit. It is to be understood therefore that the invention is not limited to any specific form or embodiment, except insofar as any limitations are specified in the appended claims.

What is claimed is:

1. In or for a plastic extruding machine of the rotary screw conveyor type, a perforated unit through which the plastic material is forced by the rotary screw conveyor and comprising an open mesh screen and a supporting plate making face contact therewith and formed with a multiplicity of through holes distributed over its effective area, said supporting plate also having a solid center portion for supporting a die core on the outlet side of the perforated unit as well as a cone shaped protuberance on the entrance side thereof and extending upstream therefrom, said cone shaped protuberance having its conical surface terminating in a base which covers the whole area of the solid center portion of the supporting plate, said screw conveyor terminating in an impeller cooperating with the perforated unit to force the material therethrough and having a cutting edge which severs the material on the entrance side of the perforated unit as it enters the perforations thereof, said impeller being formed with a center recess to accommodate the cone shaped protuberance, said recess affording enough clearance to avoid contact with the protuberance under all conditions of use of the machine, said conical surface being free throughout its whole area to permit the material advanced under the propelling force of the screw conveyor to come in contact therewith throughout said whole area and to cause thereby the contacting material to be advanced downstream and along said conical surface towards the perforations in said unit by the propelling force of the screw conveyor, thus preventing the material in the dead area of the perforated unit from becoming static and burning.

2. A combination according to claim 1, wherein the impeller recess is of notch form with open sides to permit the passage of the material therethrough from the main stream of material during the rotation of the impeller.

3. A combination according to claim 2, wherein the walls of the impeller recess act as cutting edges which sweep around the cone-shaped protuberance during the rotation of the impeller to keep the material in motion and force it into the screen area.

4. A combination according to claim 1 comprising means for adjusting the perforated unit laterally of its axis and relative to the screw conveyor for locating the die core in proper relation to the die.

References Cited in the file of this patent

UNITED STATES PATENTS

| | | |
|---|---|---|
| 1,730,638 | Young | Oct. 8, 1929 |
| 2,210,004 | Rautenstrauch | Aug. 6, 1940 |
| 2,539,128 | Gray | Jan. 23, 1951 |
| 2,595,210 | Clinefelter | Apr. 29, 1952 |
| 2,607,954 | Schneider et al. | Aug. 26, 1952 |
| 2,728,943 | Hertz et al. | Jan. 3, 1956 |
| 2,821,745 | Patton | Feb. 4, 1958 |